(No Model.)

W. C. EVANTS.
FRUIT PITTER.

No. 453,042. Patented May 26, 1891.

WITNESSES
Jno. G. Hinkel
J. A. Watson

INVENTOR
Wm. C. Evants
By Foster & Freeman
Attorneys

UNITED STATES PATENT OFFICE.

WILLIAM C. EVANTS, OF OAKLAND, CALIFORNIA.

FRUIT-PITTER.

SPECIFICATION forming part of Letters Patent No. 453,042, dated May 26, 1891.

Application filed August 8, 1890. Serial No. 361,443. (No model.)

*To all whom it may concern:*

Be it known that I, WILLIAM C. EVANTS, a citizen of the United States, residing at Oakland, in the county of Alameda, State of California, have invented certain new and useful Improvements in Fruit-Pitters, of which the following is a specification.

My invention relates to fruit-pitters; and it consists in an improved machine for pitting clingstone fruits, which will be fully described in the following specification, reference being had to the accompanying drawings, in which—

Figure 1:
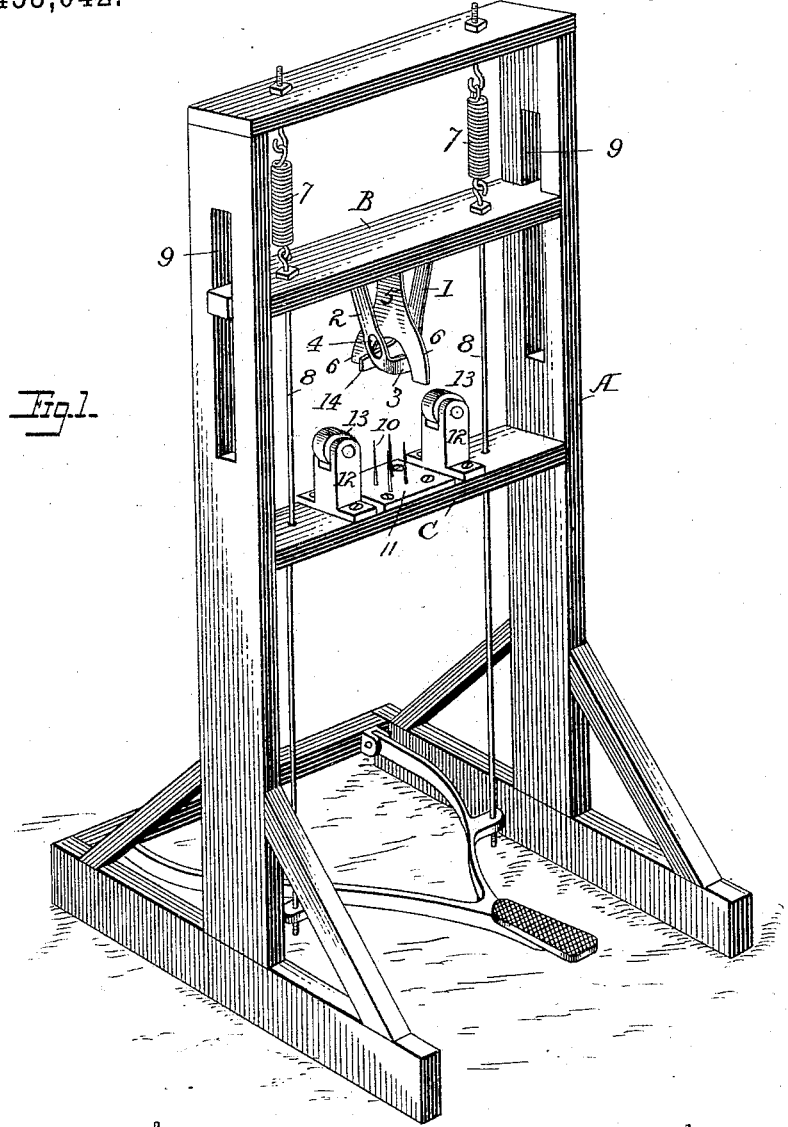
Figure 2:
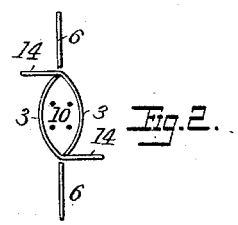
Figure 3:
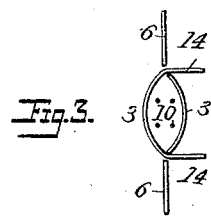

Figure 1 is a perspective view of my machine. Fig. 2 is a plan view of the knife-edges and the holder for the fruit to be pitted, and Fig. 3 is a view of another form of the knife-edges.

Within a frame A of any desired form is mounted a cross-head B, which is arranged to slide in suitable guides 9. The head B is normally held in a raised position by springs 7, and it is drawn down, when it is desired to operate the machine, by rods or cords 8, attached to a treadle or other similar mechanism. Below the cross-head B a fixed support C is arranged.

Upon the under side of the cross-head are attached three downwardly-extending knives 1 2 5. The knives 1 and 2 are preferably similar in construction, as shown in Figs. 1 and 2, each having a rounded or semi-oval blade 3, provided at one end with a laterally-extending wing 14 and a spring-shank which is inclined upwardly and outwardly to its point of connection with the cross-head. The rounded blades 3 are concave toward each other, and are preferably made to conform more or less accurately to the stone of the fruit to be pitted. The wing portions 14 are straight, and they are bent at such an angle to the curved portions that they always contact with the end of the curved blade opposite the one to which they are attached, in order that the pit may be entirely encircled by the knives. The wing portions may both be upon one blade, as shown in Fig. 3.

In the blades 3, at a suitable distance above their edges, are oblong holes 4, through which the sides of the pit may protrude to permit the knife-edges to close together over its lower end. These holes I make sufficiently large to permit the pits to drop out through them as each pit is forced upward by the succeeding one.

A central knife 5 is arranged between the knives 1 2. It is bifurcated and its branches or blades 6 extend down on either side of the blades 3. The blades 6 are arranged at right angles with the wing-blades 14 and are located adjacent thereto.

As a means for holding the fruit and to prevent it from being mashed, I arrange upon the support C a holder, consisting of several pointed spikes or pins 10. These pins are grouped centrally beneath the opening between the blades 3, and are for the purpose of receiving upon their points the pit of the fruit and pushing the same through between the knives 3 as the latter are forced through the fruit. I have shown a holder composed of four pins set in a plate 11, which is fastened upon the support C, although more or fewer pins may be used, if desired.

The operation of my invention so far as described is as follows: The fruit to be pitted—a peach, for instance—is pressed stem end downward upon the holder 10 until the pit rests upon the points of the spikes. The cross-head B is then depressed, and the knives 1 2, which have spring-shanks, cut vertically until they strike the pit. As the cross-head is further depressed the edges of the knives spread apart, following the contour of the pit until its widest part is reached, after which the tension of the spring-shanks causes the blades to follow the narrowing contour of the lower half of the pit until they resume their normal positions. At the same time the blades 6 6 (which may be omitted, if desired) sever the fruit into halves.

It sometimes happens when pitting hard fruit that the blades 3 after reaching the middle of the pit do not close over its lower half if subject only to the action of the spring-shanks. To cure this defect and cause the knives to cut away as much of the fruit as possible from the pit, I provide upon the support C a pair of shoulders 12, preferably having friction-rollers 13 mounted thereon. The shoulders 12 are so located that when the blades 3 reach the middle or largest part of the pit their inclined shanks will come in contact with the shoulders, and upon further depressing the cross-head the blades will be forced positively inward and caused to follow the lower half of the pit closely and prevent waste.

It is obvious that instead of having the cross-head B movable it might be fixed, and the part C might be made to move up and down, it being immaterial which part is movable. If desired, both parts may be made movable and arranged to move toward and away from each other.

Without limiting myself to the precise construction shown, I claim—

1. In a fruit-pitter, the curved blades having the openings 4 in their shanks, substantially as described.

2. In a fruit-pitter, the curved blades 3, having the wing-blades 14 and the openings 4 in their shanks, substantially as described.

3. The combination of the knives 1 and 2, having spring-shanks and curved blades with wings, said wings each extending from the blade to which it is attached across the side edges of the other blade and parallel to the direction in which the blades spring apart, so that the pit may be completely encircled by the blades; and a knife 5, having straight blades 6 6 outside and independent of the wing-blades, substantially as described.

4. In a fruit-pitter, the combination, with the fruit-holder consisting of a group of pointed pins arranged upon a support, of a pair of curved blades having wing-blades 14 attached thereto and spring-shanks, and blades 6 6, arranged upon either side of the curved blades, all of said blades being fixed upon a cross-head, the curved blades being arranged to encircle the points of the pins when depressed, substantially as described.

5. In a fruit-pitter, the combination of the knives 1 2, having the inclined shanks, with the support C, having the shoulders 12, substantially as described.

6. In a fruit-pitter, the combination of the knives 1 2, having the inclined shanks, with the support C, having the shoulders 12, provided with rollers 13, substantially as described.

In testimony whereof I have signed my name to this specification in the presence of two subscribing witnesses.

WILLIAM C. EVANTS.

Witnesses:
DU RAY SMITH,
MARY B. PRATT.